3,850,921
DERIVATIVES OF 2,3-NORBORNANEDI-
CARBOXAMIDE
Ichiro Matuo, Tokyo, Japan, and Sadao Ohki, 6-24-705
Sengoku 1-chome, Bunkyo-ku, Tokyo, Japan; said
Matuo assignor to said Ohki
No Drawing. Filed Sept. 20, 1972, Ser. No. 290,596
Int. Cl. C07d 27/50
U.S. Cl. 260—247.2 A     12 Claims

ABSTRACT OF THE DISCLOSURE

A series of 5-endo-benzoyloxy-N-[amino(lower)alkyl] bicyclo[2.2.1]heptane-2,3-di-endo-carboxylic acid imides have been found to possess unique prophylatic and therapeutical activity an anti-arrhythmia agents. An example of such a compound possessing excellent activity is 5-endo-benzoyloxy-N-(3 - dimethylaminopropyl)bi-cyclo-[2.2.1]heptane-2,3-di-endo-carboxylic acid imide hydrochloride.

BACKGROUND OF THE INVENTION

1. Field of the Invention

This invention relates to a novel series of 5-endo-benzoyloxy - N - [amino(lower)alkyl]bicyclo[2.2.1]heptane-2,3-di-endo-carboxylic acid imides possessing antiarrhythmic and/or antifibrillatory activity.

2. Description of the Prior Art

A. British Pat. No. 1,042,840 describes compounds having the formula

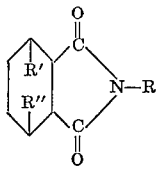

in which each of R' and R" represent hydrogen, or together an alkylene group having 1 or 2 carbon atoms, and R represents an alkyl group having 6 to 18, preferably 8 to 12 carbon atoms in a straight chain as having particularly advantageous properties as functional fluids.

B. U.S. Pat. No. 2,393,99 describes the compound having the formula

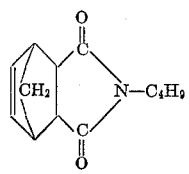

as being an effective insecticide.

C. U.S. Pat. No. 2,424,220 describes the compound having the formula

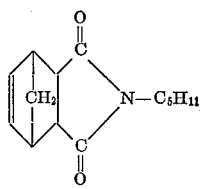

as being an effective insecticide.

D. U.S. Pat. No. 2,462,835 describes the compound having the formula

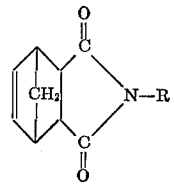

in which R is alkyl, alkene, aryl, substituted aryl, alkynl, etc. as insecticides.

E. Culberson and Wilder, Jr., J. Org. Chem., 25, pp. 1358–62 (1960) report the preparation of compounds having the formula

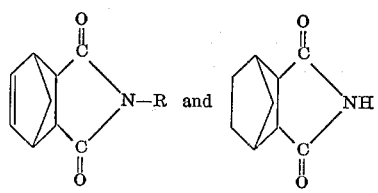

in which R is $CH_3$, $C_6H_{13}$ or hydrogen.

F. Rice, Reide and Grogan, J. Org. Chem., 19, pp. 884–893 (1954) report the preparation of compounds of the formula

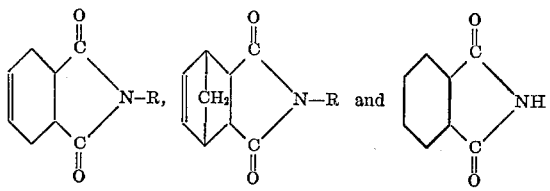

in which R is alkyl and their subsequent reduction with lithium aluminum hydride.

G. Worrall, J. Am. Chem. Soc., 82, pp. 5707–5711 (1960) reports the preparation of compounds having the formula

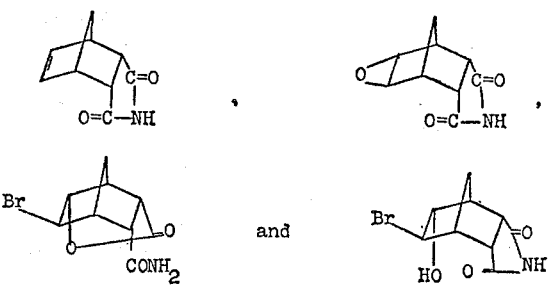

H. German Auslegeschrift No. 1,179,205 reports the preparation of compounds having the formula

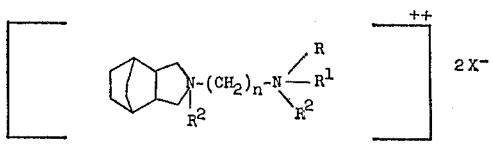

in which the bicyclo[2.2.2]octane ring system in saturated or unsaturated and/or substituted, R and $R^1$ are alkyl or alkenyl groups of 1 to 5 carbon atoms, or when combined with the nitrogen a heterocyclic ring. $R^2$ is a (lower)alkyl group, $n$ is a number of 2 to 5 and X a halogen anion. The quaternary compounds are described as having therapeutic properties in the treatment of cardiovascular disease, specifically high blood pressure.

SUMMARY OF THE INVENTION

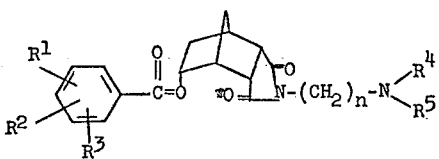

wherein $R^1$, $R^2$ or $R^3$ is H, Cl, Br, F, (lower)alkyl, nitro, OH or (lower)alkoxy, $n$ is an integer of 2 to 4 inclusive and $R^4$ or $R^5$ is H, (lower)alkyl or when taken together with the nitrogen a radical of the formula

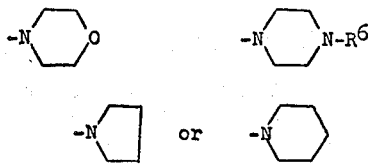

in which $R^6$ is (lower)alkyl– or a pharmaceutically acceptable acid addition salt thereof are anti-arrhythmic agents.

Cardiac arrhythmia, a phenomenon commonly associated with coronary heart disease or myocardial infarction, is an affliction not uncommon in humans, especially the elderly. The mechanism of cardiac arrhythmia is suspected to be caused by an abnormal "focus" in the ventricle of the heart which sends out (fires) nerve signals more rapidly than required for the normal beating of the heart. Uncontrolled arrhythmia can lead to fibrillation which results in death.

It has been discovered that the series of compounds herein designated 5-*endo*-benzoyloxy-N-[amino-(lower)alkyl]bicyclo[2.2.1]heptane-2,3-di-*endo*-carboxylic acid imides having the formula

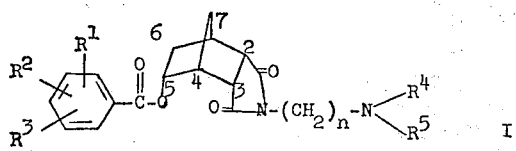

wherein $R^1$, $R^2$ or $R^3$ is H, Cl, Br, F, (lower)alkyl, nitro, OH or (lower)alkoxy, $n$ is an integer of 2 to 4 inclusive and $R^4$ or $R^5$ is H, (lower)alkyl or when taken together with the nitrogen a radical of the formula

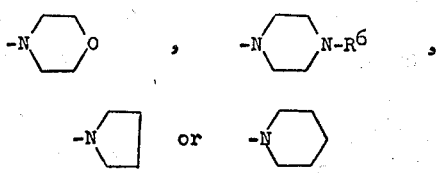

in which $R^6$ is (lower)alkyl; or a pharmaceutically acceptable acid addition salt thereof are useful therapeutic or prophylactic agents in the suppression of the abnormal ectopic beat.

Compound I can theoretically exist in several isomeric forms, namely;

A. endo-aroyloxy:endo-substituted imide;
B. exo-aroyloxy:exo-substituted imide (X);
C. endo-aroyloxy:exo-substituted imide; and
D. exo-aroyloxy:endo-substituted imide.

Furthermore, each of these isomers has two optical isomers; levorotatory and dextrorotatory.

The distinction between the isomers is determined by the relative position of the constituent bonds at positions 2, 3 and 5 of the bicyclo ring system.

When these bonds, i.e., the constituent bonds at positions 2, 3 and 5, are on the same side as the $C_7$ bridge we have the exo-exo isomer. When these bonds, i.e., the constituent bonds at positions 2, 3 and 5 are on the opposite side of the $C_7$ bridge or alternately within the cage formed by carbon atoms 2, 3, 5 and 6, then we have the endo-endo isomer. When the constituent bond at position 5 is on the same side as the $C_7$ bridge and the constituents bond 2 and 3 are on the opposite side of the $C_7$ bridge, then we have the exo(5-position)-endo-(2,3-position) isomer. When the constituent bond at position 5 is on the opposite side of the $C_7$ bridge and the constituents bonds 2 and 3 on the same side as the $C_7$ bridge. Illustrative of the exo-exo isomer is the compound having the formula

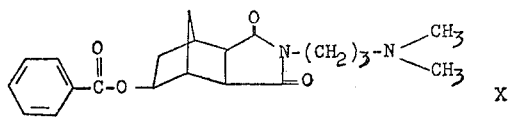

Illustrative of endo-endo is the compound of formula I.

The only isomers claimed in this invention are the endo-endo isomers as represented by compound I and the dextro- and levorotatory isomers thereof. The endo-endo isomers are inherently exclusively produced by the synthesis described herein.

Some exo-endo isomers have been prepared by another synthetic route and have been found to be inactive in regulating cardiac arrhythmia, e.g., 5-*exo*-benzoyloxy-N-(3-dimethylaminopropyl) - bicyclo[2.2.1]heptane - 2,3 - di-*endo*-carboxylic acid imide hydrochloride.

The optical isomers can be separated and isolated by fractional crystallization of the diastereoisomeric salts formed, for instance, with (+) or (−)-tartaric acid or D-(−)-camphor sulfonic acid (see experimental).

For the purpose of this disclosure, the term "(lower)alkyl" is defined as an alkyl radical containing 1 to 6 carbon atoms. The term "(lower)alkoxy" is an alkoxy radical containing 1 to 6 carbon atoms. The term "pharmaceutically acceptable acid addition salt" is defined to include all those inorganic and organic acid salts of the compounds of the instant invention, which salts are commonly used to produce nontoxic salts of medicinal agents containing amine functions. Illustrative examples would be those salts formed by mixing the compounds of formula I with hydrochloric, sulfuric, nitric, phosphoric, phosphorous, hydrobromic, maleic, ascorbic, citric or tartaric, pamoic, lauric, stearic, palmitic, oleic, myristic, laurylsulfonic, naphthalenesulfonic, linoleic or linolenic acid, and the like.

A preferred embodiment of the present invention is the compound having the formula

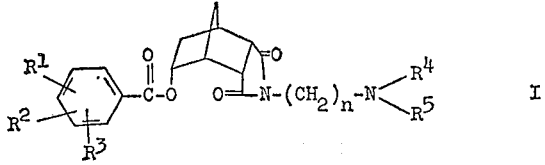

wherein $R^1$, $R^2$ or $R^3$ is H, Cl, Br, F, (lower)alkyl, nitro, OH or (lower)alkoxy, $n$ is an integer of 2 to 4 inclusive and $R^4$ or $R^5$ is H, (lower)alkyl or when taken together with the nitrogen a radical of the formula

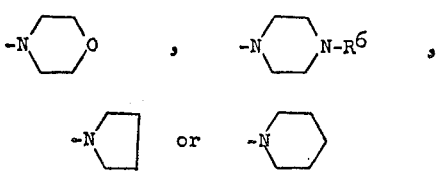

in which $R^6$ is (lower)alkyl; or a pharmaceutically acceptable acid addition salt thereof.

Another preferred embodiment of the present invention is the compound having the formula

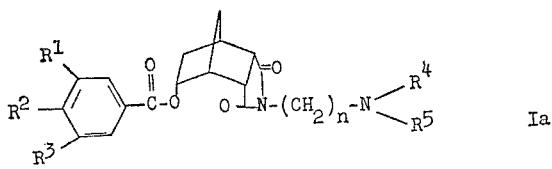 Ia wherein $R^1$, $R^2$ or $R^3$ is H, Cl, Br, F, (lower)alkyl, nitro, OH or (lower)alkoxy, $n$ is an integer of 2 to 4 inclusive and $R^4$ and $R^5$ is H, (lower)alkyl or when taken together with the nitrogen a radical of the formula

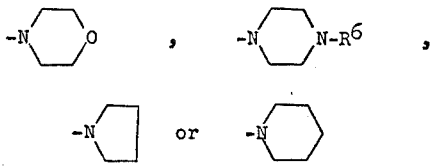

in which $R^6$ is (lower)alkyl; or a pharmaceutically acceptable acid addition salt thereof.

Another preferred embodiment is the compound of formula Ia wherein $R^1$, $R^2$ or $R^3$ is H, F, Cl, nitro or (lower)alkoxy $R^4$ and $R^5$ are H, (lower)alkyl or when taken together with the nitrogen a radical of the formula

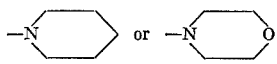

Another preferred embodiment is the compound of formula Ia wherein $R^1$, $R^2$ and $R^3$ are (lower)alkoxy, $R^4$ and $R^5$ are (lower)alkyl or when taken together with the nitrogen a radical of the formula

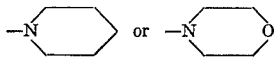

Another preferred embodiment is the compound of formula Ia wherein $R^1$ and $R^3$ are hydrogen, $R^2$ is $NO_2$, hydrogen or chloro, $R^4$ and $R^5$ are (lower)alkyl or when taken together with the nitrogen a radical of the formula

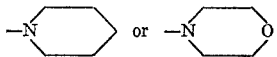

A more preferred embodiment is the compound of formula Ia wherein $R^1$ and $R^3$ are hydrogen, $R^2$ is chloro, $n$ is an integer of 3 and $R^4$ and $R^5$ are methyl; or the hydrochloride salt thereof.

A most preferred embodiment of the present invention is the compound of formula Ia wherein $R^1$, $R^2$ and $R^3$ are hydrogen, $n$ is an integer of 3 and $R^4$ and $R^5$ are methyl; or the hydrochloride salt thereof.

A more preferred embodiment is the compound of formula Ia wherein $R^1$, $R^2$ and $R^3$ are hydrogen, $n$ is an integer of 2 and $R^4$ and $R^5$ are methyl; or the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ taken together with the nitrogen is a radical of the formula

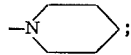;

or the hydrochloride salt thereof.

A more preferred embodiment is the compound of formula Ia wherein $R^1$, $R^2$ and $R^3$ are methoxy, $n$ is an integer of 3 and $R^4$ and $R^5$ are methyl; or the hydrochloride salt thereof.

A more preferred embodiment is the compound of formula Ia wherein $R^1$, $R^2$ and $R^3$ are methoxy, $n$ is an integer of 2 and $R^4$ and $R^5$ are methyl; or the hydrochloride salt thereof.

A more preferred embodiment is the compound of formula Ia wherein $R^1$ and $R^3$ are hydrogen, $R^2$ is chloro, $n$ is an integer of 3 and $R^4$ and $R^5$ taken together with the nitrogen is a radical of the formula

;

of the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ when taken together with the nitrogen is a radical of the formula

;

of the hydrochloride salt thereof.

A more preferred embodiment is the compound of formula Ia wherein $R^1$ and $R^3$ are hydrogen, $R^2$ is chloro, hydrogen or nitro, $n$ is an integer of 3 and $R^4$ and $R^5$ are each (lower)alkyl; or the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ are methyl; or the hydrochloride salt thereof.

A most preferred embodiment is the levorotatory isomers of the compound of formula Ia.

Another most preferred embodiment is the dextrorotatory isomers of the compound Ia.

The most preferred embodiment of the present invention is the dextrorotatory isomer of the compound Ia wherein $R^1$, $R^2$ and $R^3$ are hydrogen, $n$ is 3 and $R^4$ and $R^5$ are methyl; or the hydrochloride salt thereof.

Another most preferred embodiment of the present invention is the levorotatory isomer of the compound Ia wherein $R^1$, $R^2$ and $R^3$ are hydrogen, $n$ is 3 and $R^4$ and $R^5$ are methyl; or the hydrochloride salt thereof.

The objectives of the present invention have been achieved by the process of preparing the compounds having the formula

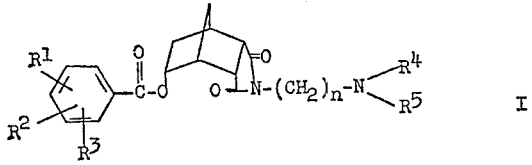 I wherein $R^1$, $R^2$ or $R^3$ is H, Cl, Br, F, (lower)alkyl, nitro, OH or (lower)alkoxy, $n$ is an integer of 2 to 4 inclusive and $R^4$ or $R^5$ is H, (lower)alkyl or when taken together with the nitrogen a radical of the formula

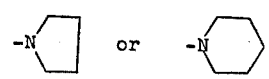

in which $R^6$ is (lower)alkyl which process comprises the consecutive steps of

A. Treating a suspension of endo-cis-bicyclo[2.2.1]hept-5-ene-2,3-dicarboxylic anhydride or exo-cis-bicyclo[2.2.1]hept-5-ene-2,3 - dicarboxylic anhydride in water, but preferably the endo-cis isomer, with excess concentrated sulfuric acid at a temperature in the range of 70–95° C. to produce the endo-endo compound having the formula

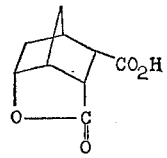 II

B. Treating 1 mole of compound II with at least one mole of acetyl chloride or phosphorous trichloride at reflux temperature for at least 15 minutes and removing the excess acetyl chloride or phosphorous trichloride in vacuo to produce an oily residue IIa;

C. Treating residue IIa with at least one mole of an amine having the formula

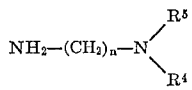

in which n is an integer of 2 to 4 inclusive, $R^4$ or $R^5$ are H, (lower)alkyl or when both are taken together with the nitrogen a radical of the formula

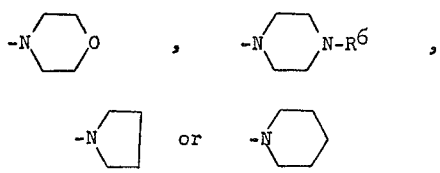

in which $R^6$ is (lower)alkyl; in an organic solvent, preferably selected from the group comprising benzene, toluene, xylene, and the like at about reflux temperatures for at least 30 minutes and removing the solvent in vacuo to produce an oily residue IIb;

D. treating residue IIb with at least one mole of potassium hydroxide in a mixture of a (lower)alkanol and water with the aid of heat, but preferably at reflux temperature for at least one hour to produce the compound having the formula

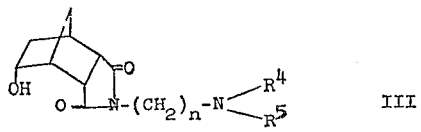

in which n, $R^4$ and $R^5$ are as above; and

E. treating one mole of compound III with at least one mole of a benzoyl halide, or its chemical equivalent, having the formula

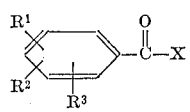

in which $R^1$, $R^2$ and $R^3$ are as defined above and X is chloro, bromo or iodo, but preferably chloro, in an organic solvent, preferably selected from the group comprising benzene, toluene, xylene, pyridine, but preferably pyridine, in a temperature range of 0° C. to 60° C., but preferably at about room temperature to yield compound I.

PHARMACOLOGY

Acute intravenous $LD_{50}$'s (lethan dose in 50% of the animals tested) with 95% confidence limits were obtained for compounds Ib [(Racemic) (±)-5-endo-Benzoyloxy-N - (3 - dimethylaminopropyl) - bicyclo[2.2.1]heptane-2,3-endo-dicarboxylic acid imide hydrochloride], V [(—)-5 - endo - Benzoyloxy - (3 - dimethylaminopropyl) - bicyclo[2.2.1]heptane - 2,3 - endo - dicarboxylic acid imide hydrochloride and VI [(+)-5-endo-Benzoyloxy-(3-dimethylaminopropyl) - bicyclo[2.2.1heptane - 2,3 - endo-dicarboxylic acid imide hydrochloride as follows:

| Species | Compound | $LD_{50}$ with 95% confidence limits, mg./kg. |
|---|---|---|
| Mouse | Ib | 26 (23–20.4) |
|  | V | 43.5 (40.7–26.5) |
|  | VI | 14.5 (12.2–16) |
| Rat | Ib | 25 (23.6–26.5) |
|  | V | 39 (35.9–42.3) |
|  | VI | 21 (18.6–23.7) |

The compounds were tested in dogs for their reversion activity in ouabain-induced arrhythmia:

Anesthetized dogs were used for the production of ouabain-induced ventricular arrhythmias. The arrhythmia consisted of a nodal or ventricular tachycardia. The procedure used to establish the arrhythmia as well as the criteria employed to determine anti-arrhythmic activity generally was that employed by Lucchesi et al.[1] Intravenous infusion of Ib, V and VI was done at a rate of 0.2 mg./kg./min. and compared to lidocaine and quinidine. The average reverting doses are shown below.

| Compound | Reverting Dose, mg./kg. |
|---|---|
| Ib | 1.7 |
| V | 2.3 |
| VI | 2.8 |
| Quinidine | 4.9 |
| Lidocaine | 6.6 |

The compounds were also tested for their reversion of ventricular arrhythmia due to coronary artery ligation in conscious dogs:

Multifocal ventricular ectopic rhythms were produced in dogs according to the coronary artery ligation method of Harris[2]. Approximately 24 hours after induction of the ventricular arrhythmia the test drugs were infused at a rate of 0.2 mg./kg./min. The approximate average doses necessary to produce a 50% decrease in the number of ventricular ectopic beats, and to produce reversion of the ventricular arrhythmia are shown below. In contrast to Ib and VI, no reversion was observed with an intravenous infusion of lidocaine or quinidine in doses of up to 20 mg./kg.

| Compound | Dose producing 50% reduction in ectopic beats | Rverting dose |
|---|---|---|
| Ib | 2.4 | 10 |
| V | 3.3 | >11 |
| VI | 3.0 | 7 |
| Lidocaine | >20 | >20 |
| Quinidine | 10.1 | >20 |

All the compounds within the scope of the present invention possess anti-arrhythmic activity.

The compounds of the present invention are useful in the treatment of cardiac arrhythmia in mammals, including man, as prophylactic or therapeutic agents in doses in the range of 0.25 mg. to 3.0 mg./kg. up to 3 or 4 times a day.

EXPERIMENTAL

EXAMPLE 1

Preparation of Bicyclo[2.2.1]heptane-endo-2,3-dicarboxylic acid-5-endo-hydroxy-γ-lactone (II)

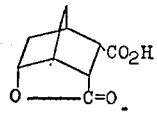

Five hundred grams (500 g.) of concentrated sulfuric acid was slowly added with vigorous stirring to a suspension of 164 g. of endo-cis-bicyclo[2.2.1]hept-5-ene-2,3-dicarboxylic anhydride in 500–600 ml. of water. The reaction was exothermic and the temperature rose to about 80–90° C. during the addition of the sulfuric acid. Two liters of boiling water was added to the reaction solution and immediately filtered. As the filtrate was cooled, colorless platelets of the title product (II) crystallized. On com-

---

[1] Lucchesi, B. L. and H. F. Hardman: The influence of dichloroisoproterenol (DCI) and related compounds upon ouabain and acetylstrophanthidin induced cardiac arrhythmias. J. Pharmacol. Exp. Therap., 132:372, 1961.

[2] Harris, A. S. Delayed development of ventricular ectopic rhythms following experimental coronary occlusion. Circulation 1:1318, 1950.

pletion of the crystallization, the crystals were collected by filtration and washed with cold water to produce 138 grams of air-dried crystals, m.p. 200° C.

EXAMPLE 2

General Method of Preparation of 5-*endo*-Hydroxy-N-[amino(lower)alkyl]bicyclo[2.2.1]heptane - 2,3 - di-*endo*-carboxylic Acid Imides (III)

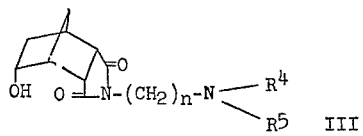

A mixture of 0.1 mole of lactone (II) from example 1 and 50 ml. of acetyl chloride was refluxed on a water bath for two hours. The excess acetyl chloride was removed *in vacuo* and an oily residue (IIa) remained that was washed with n-hexane (or petroleum ether). The oily residue was dissolved in 50 ml. of anhydrous benzene. To this solution was added a solution of 0.12 moles of the appropriate amine, e.g., N,N-dimethylaminopropylamine, and 100 ml. of anhydrous benzene with stirring. The mixture was then refluxed for about five hours and concentrated *in vacuo*. The resultant brown syrupy substance (IIb) was refluxed for five hours in 300 ml. of 0.12 mole of potassium hydroxide and 50% water-ethanol. The solvents were removed *in vacuo*, saturated potassium carbonate solution added and the resultant solution extracted repeatedly using chloroform or 1:1 ethyl acetate-benzene. The collective organic extracts were washed with saturated sodium chloride solution and dried over anhydrous sodium sulfate. After filtration, the solution was concentrated *in vacuo* and the product was recovered by crystallization, chromatography and/or vacuum distillation wherein in formula III, $n$ is an integer of 2 to 4 inclusive, $R^4$ or $R^5$ is H, (lower)alkyl or when taken together with the nitrogen a radical of the formula

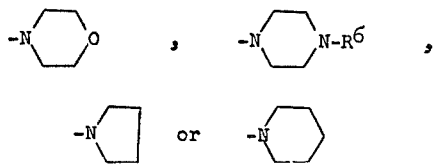

in which $R^6$ is (lower)alkyl.

EXAMPLE 3

General Method of Preparation of 5-*endo*-benzoyloxy-N-[amino(lower)alkyl]bicyclo[2.2.1]heptane - 2,3 - di-*endo*-carboxylic Acid Imides (I)

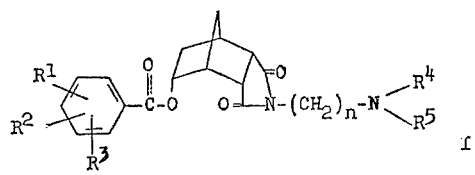

The 5-*endo*-Hydroxy-N-[amino(lower)alkyl] - bicyclo-[2.2.1]heptane-2,3-di-*endo*-carboxylic acid imide (III) (0.01 mole) obtained in example 2 was added to 50 ml. of a 100:1 pyridinepiperidine solution of 0.012 mole of an appropriate benzoyl halide, e.g., benzoyl chloride, with stirring. The resultant mixture was allowed to stand overnight in a refrigerator or warmed in a water- or oil-bath. The mixture was poured into ice-water and saturated with sodium carbonate and then extracted with chloroform or 1:1 benzeneethyl acetate. The combined organic extracts were washed with saturated sodium chloride solution and dried over anhydrous sodium sulfate. The solution was collected filtration and concentrated *in vacuo* to yield the desired title product (I).

EXAMPLE 4

Alternate Method of Preparation of 5-*endo*-Hydroxy-N-[amino(lower)alkyl]bicyclo[2.2.1heptane] - 2,3 - di-*endo*-carboxylic Acid Imides (III)

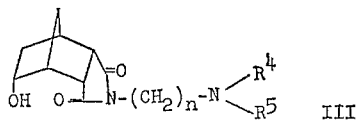

A mixture of 0.1 mole of lactone (IIa) from example above and 30 ml. of PCl₃ was refluxxed in a water bath for two hours. The excess PCl₃ was removed *in vacuo* and washed with n-bexane. The oily residue was dissolved in 50 ml. of chlosoform or methylene chloride and a solution of 0.12 mole of an appropriate amine, e.g., N,N-dimethylaminopropylamine, dissolved in 100 ml. of anhydrous chloroform or methylene chloride was added with stirring and cooling. Stirring was continued for two hours, following which the mixture was warmed to room temperature following which the mixture was refluxed for about 15 minutes. The solution was washed with saturated potassium carbonate solution after cooling, separated, and the organic phase washed with saturated sodium chloride solution. The organic solution was dried over anhydrous sodium sulfate, filtered, and concentrated *in vacuo*. The material subsequently collected was the title product of formula III wherein $n$ is an integer of 2 to 4 inclusive, $R^4$ or $R^5$ is H, (lower)alkyl or when taken together with the nitrogen a radical of the formula

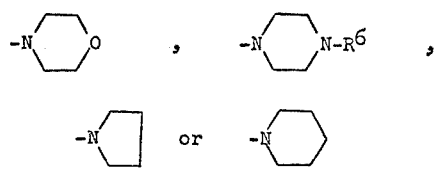

in which $R^6$ is (lower)alkyl.

EXAMPLE 5

Preparation of 5-*endo*-Hydroxy-N-(3-dimethylaminopropyl)-bicyclo[2.2.1]-heptane-2,3 - di - *endo* - carboxylic Acid Imide (IIIa)

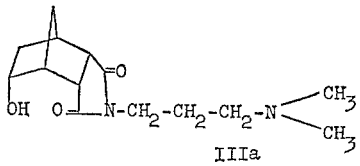

Substitution in the procedure of example 2 or 4 of an equimolar quantity of N,N-dimethylaminopropylamine for the "appropriate" amine used therein produced the title product as colorless plates when crystallized from ethanol-n-hexane; m.p. 148° C. (1¾ H₂O) or 154° C. (⅓ H₂O). Yield: 26–37%.

*Anal.*—Calc'd. for C₁₄H₂₂O₃N₂·1¾ H₂O: C, 56.42; H, 8.79; N, 9.40. Found: C, 56.70; H, 8.76; N, 9.11.

*Anal.*—Calc'd. for C₁₄H₂₂O₃N₂·⅓ H₂O: C, 61.76; H, 8.45; N, 10.29. Found: C, 61.93; H, 8.76; N, 10.40.

EXAMPLE 6

Preparation of 5-*endo*-Benzoyloxy - N-(3-dimethylaminopropyl)-bicyclo[2.2.1]heptane - 2,3 - di-*endo*-carboxylic Acid Imide (Ib)

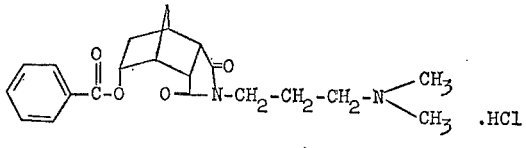

A. Substitution in the procedure of example 3 of an equimolar quantity of benzyol chloride for the "appropriate" benzoyl halide used therein and for the dicarboxylic acid imide III an equimolar quantity of IIIa obtained in example 5 produced the title product which was collected as the hydrochloride salt.

B. The free base was dissolved in near boiling ethanol (700 ml.) and 90 ml. of ethanol saturated with hydrogen chloride gas was added. The solution was cooled with ice to produce colorless plates of the hydrochloride salt of formula Ib; m.p. 239° C. with decomposition upon recrystallization from methanolacetone. Yield—90%.

Anal.—Calc'd. for $C_{21}H_{27}O_4N_2Cl\cdot\frac{1}{3}$ $H_2O$: C, 61.07; H, 6.83; N, 6.95. Found: C, 60.63; H, 6.88; N, 7,33.

EXAMPLE 7

Preparation of 5-endo-3,4,5 - Trimethoxybenzoyloxy-N-(3 - dimethylaminopropyl) - bicyclo[2.2.1]heptane-2,3-di-endo-carboxylic Acid Imide Hydrochloride (Ic)

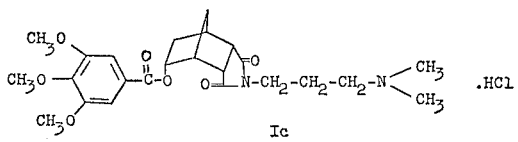

Substitution in the procedure of example 3 for the "appropriate" benzoyl halide used therein of an equimolar quantity of 3,4,5-trimethoxybenzoyl chloride and for the dicarboxylic acid imide III an equimolar quantity of IIIa produced the title compound which was collected as the hydrochloride salt (using a method equivalent to that employed in example 6B). The hydrochloride was collected as colorless plates upon recrystallization from water-ethanol; m.p. 250.2° C.; yield: 22%.

Anal.—Calc'd. for $C_{24}H_{31}O_7N_2\cdot HCl\cdot H_2O$: C, 56.96; H, 6.77; N, 5.54. Found: C, 56.64; H, 6.76; N, 5.59.

EXAMPLE 8

Preparation of 5-endo - 4 - Nitrobenzoyloxy - N-(3-dimethylaminopropyl)-bicyclo[2.2.1]heptane - 2,3 - di-endo-carboxylic Acid Imide Hydrochloride (Id)

Substitution in the procedure of example 3 for the "appropriate" benzoyl halide used therein of an equimolar quantity of 4-nitrobenzoyl chloride and for the dicarboxylic acid imide III an equimolar quantity of IIIa produced the title compound which was collected as the hydrochloride salt (using a method comparable to that employed in example 6B). The hydrochloride salt was collected as pale yellow plates upon recrystallization from water-ethanol; m.p. 197° C. Yield: 30%.

Anal.—Calc'd. for $C_{21}H_{25}O_6N_3\cdot HCl\cdot 2H_2O$: C, 51.68; H, 6.20; N, 8.61. Found: C, 51.35; H, 6.35; N, 8.58.

EXAMPLE 9

Preparation of 5-endo - 4 - Chlorobenzoyloxy-N-(3-dimethylaminopropyl)bicyclo[2.2.1]heptane - 2,3 - di-endo-carboxylic Acid Imide Hydrochloride (Ie)

Substitution in the procedure of example 3 for the "appropriate" benzoyl halide used therein of an equimolar quantity of 4-chlorobenzoyl chloride and for the dicarboxylic acid imide III an equimolar quantity of IIIa produced the title compound which was collected as the hydrochloride (using a method comparable to that employed in example 6B). The hydrochloride was collected as colorless plates upon recrystallization from water-ethanol; m.p. 208° C.

Anal.—Calc'd. for $C_{21}H_{25}O_4N_2Cl\cdot 1\frac{1}{2}H_2O$: C, 54.01; H, 6.26; N, 6.00. Found: C, 53.84; H, 5.91; N, 6.14.

EXAMPLE 10

Preparation of 5-endo-Hydroxy-N-(2-dimethylaminoethyl)bicyclo[2.2.1]heptane-2,3-di-endo - carboxylic Acid Imide (IIIb)

Substitution in the procedure of example 4 for the "appropriate" amine used therein of an equimolar quantity of N,N-dimethylethylamine produced the title product which was collected as the hydrochloride using a method comparable to that employed in example 6B. The free base was collected as colorless plates upon recrystallization from ethanol-n-hexane; m.p. 141.5° C. Yield: 50%.

Anal.—Calc'd. for $C_{13}H_{20}O_3N_2\cdot\frac{1}{3}H_2O$: C, 60.46; H, 8.13; N, 10.85. Found: C, 60.71; H, 8.04; N, 10.95.

EXAMPLE 11

Preparation of 5-endo-Hydroxy - N - (2-diethylaminoethyl)bicyclo[2.2.1]heptane-2,3-di-endo - carboxylic Acid Imide Phenolphthalinate (IIIc)

Substitution in the procedure of example 2 for the "appropriate" amine used therein of an equivalent amount of N,N-diethylaminoethylamine produced the title product as yellow oil, b.p. 213–220° C./5 mm. Hg. Yield: 37%. The product was further characterized as the phenolphthalinate salt, m.p. 137.8–138.8° C.

Anal.—Calc'd. for $C_{35}H_{40}O_7N_2\cdot 1\frac{1}{2}H_2O$: C, 67.04; H, 6.91; N, 4.48. Found: C, 67.38; H, 7.41; N, 4.23.

EXAMPLE 12

Preparation of 5-endo-3,4,5-trimethoxybenzoyloxy-N-(2-diethylaminoethyl)bicyclo[2.2.1]heptane-2,3-di - endo-carboxylic Acid Imide Hydrochloride (If)

Substitution in the procedure of example 3 for the "appropriate" benzoyl halide used therein of an equimolar amount of 3,4,5-trimethoxybenzoyl chloride and for the di-carboxylic acid imide III used therein an equimolar quantity of IIIc produced the title product which was collected as the hydrochloride (using a method comparable to that employed in example 6B). The hydrochloride was collected as hell brown plates upon recrystallization from ethanol-ethyl acetate, m.p. 174.5° C.

Anal.—Calc'd. for $C_{26}H_{35}O_7N_2Cl$: C, 58.76; H, 6.90. Found: C, 58.22; H, 6.96.

EXAMPLE 13

Preparation of 5-endo-Hydroxy-N-(3 - diethylaminopropyl)bicyclo[2.2.1]heptane-2,3-di-endo-carboxylic Acid Imide Phenolphthalinate (IIIf)

Substitution in the procedure of example 2 for the "appropriate" amine used therein of an equivalent amount of N,N-diethylaminopropylamine produced the title product as a yellow oil, b.p. 228–230° C./6 mm. Hg. Yield: 34%. The product was further characterized as the phenolphthalinate salt, m.p. 155–158° C.

Anal.—Calc'd. for $C_{36}H_{42}O_7N_2\cdot 1\frac{1}{2}H_2O$: C, 67.39; H, 7.02; N, 4.36. Found: C, 67.77; H, 6.79; N, 4.36.

EXAMPLE 14

Preparation of 5-endo-Hydroxy-N-(3-piperidinopropyl) bicyclo[2.2.1]heptane - 2,3 - di-endo-carboxylic Acid Imide (IIIe)

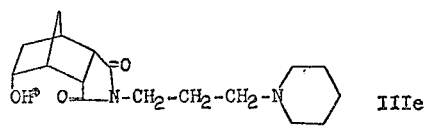

Substitution in the procedure of example 4 for the "appropriate" amine used therein of an equivalent amount of 3-piperidinopropylamine produced the title product as colorless plates upon recrystallization from isopropanol-n-hexane, m.p. 121.5° C. Yield: 50%.

Anal.—Calc'd. for $C_{17}H_{26}O_3N_2\cdot\frac{1}{4}H_2O$: C, 65.70; H, 8.53; N, 9.01. Found: C, 66.05; H, 9.03; N, 9.06.

EXAMPLE 15

Preparation of 5-*endo*-Hydroxy-N-(2-morpholinoethyl) bicyclo[2.2.1]heptane - 2,3 - di-*endo*-carboxylic Acid Imide Hydrochloride (IIIf)

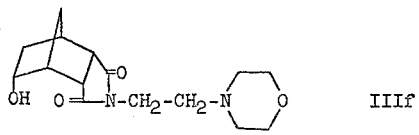   IIIf

Substitution in the procedure of example 2 or 4 for the "appropriate" amine used therein of an equivalent amount of morpholinoethylamine produced the title compound which was collected as the hydrochloride (using a method comparable to that employed in example 6B). The hydrochloride was collected as colorless plates upon recrystallization from water-ethanol, m.p. 280–282° C. Yield: 30–34%.

*Anal.*—Calc'd. for $C_{15}H_{22}O_4N_2 \cdot HCl$: C, 54.43; H, 7.00; N, 8.46. Found: C, 54.26; H, 7.56; N, 8.50.

EXAMPLE 16

Preparation of 5-*endo*-Hydroxy-N-(3-morpholinopropyl)-bicyclo-[2.2.1]heptane - 2,3 - di-*endo*-carboxylic Acid Imide (IIIg)

Substitution in the procedure of example 2 for the "appropriate" amine used therein of an equivalent amount of morpholinopropylamine produced the title product as a yellow oil, b.p. 260–270° C./4 mm. Hg.; yield 50%. The product was further characterized as the methiodide salt; m.p. 233° C.

*Anal.*—Calc'd for $C_{16}H_{24}O_4N_2 \cdot CH_3I$: N, 6.20. Found: N, 6.28.

EXAMPLE 17

Preparation of 5-*endo*-4-Nitrobenzoyloxy-N-(3-morpholinopropyl) - bicyclo[2.2.1]heptane-2,3-di-*endo*-carboxylic acid Imide (Ig)

Substitution in the procedure of example 3 for the "appropriate" benzoyl halide used therein of an equivalent amount of 4-nitrobenzoyl chloride and for the dicarboxylic acid imide III used therein an equimolar quantity of IIIg produced the title product as colorless plates upon crystallization from acetone-n-hexane, m.p. 182.5° C.

*Anal.*—Calc'd for $C_{23}H_{27}O_7N_3$: C, 60.39; H, 5.91; N, 9.19. Found: C, 60.58; H, 6.32; N, 9.28.

EXAMPLE 18

Preparation of 5-*endo*-4-Chlorobenzoyloxy-N-(3-morpholinopropyl) - bicyclo[2.2.1]heptane - 2,3 - di-*endo*-carboxylic acid Imide Hydrochloride (Ih)

Substitution in the procedure of example 3 for the "appropriate" benzoyl halide used therein of an equivalent amount of 4-chlorobenzoyl chloride and for the dicarboxylic acid imide III used therein an equimolar quantity of IIIg produced the title product which was collected as the hydrochloride (using a method comparable to that employed in example 6B). The hydrochloride was collected as colorless plates upon recrystallization from water-ethanol, m.p. 272.4° C.

*Anal.*—Calc'd for $C_{23}H_{28}O_5N_2Cl_2 \cdot \frac{1}{3}H_2O$: C, 56.44; H, 5.93; N, 5.75. Found: C, 56.40; H, 5.83; N, 5.72.

EXAMPLE 19

General Procedure for the Preparation of the racemic 5-*endo* - benzyloxy - N - [amino(lower)alkyl] - bicyclo-[2.2.1]heptane-2,3-di-*endo*-carboxylic Acid Imides into its (+) and (−) Entantiomers 1. Treatment of the racemic base with (+)-10-camphor-sulfonic acid in ethanol-water gave the diastereoisomeric salt of the (−)-isomer. Decomposition of this salt with aqueous sodium carbonate afforded the (−)-enantiomer which was converted to the hydrochloride with ethanolic hydrogen chloride.

2. The mother liquor from the first step was concentrated to leave a mixture of diastereoisomeric salts. Neutralization of this mixture was aqueous sodium carbonate gave a mixture of the (+)- and (−)-isomers, which was greatly enriched in the (+)-enantiomer. In one small scale experiment it was possible to obtain substantially pure (+)-isomer by recrystallization from cyclohexane. In larger scale experiments it was more expedient to purify the mixture through diastereoisomer formation with (−)-tartaric acid to give the salt of (−)-tartaric acid with the (+)-enantiomer, which is subsequently decomposed to produce the (+)-enantiomer.

EXAMPLE 20

Resolution of ($\mp$) - 5 - *endo*-Benzoyloxy-N-(3-Dimethylaminopropyl) - Bicyclo[2.2.1]Heptane - 2,3 - di-*endo*-Carboxylic Acid Imide Hydrochloride (Ib)

I. Preparation of the (−)-enantiomer

A. ($\mp$) - 5-*endo*-Benzoyloxy-N-(3-dimethylaminopropyl) - bicyclo[2.2.1]heptane - 2,3-di-*endo*-carboxylic Acid Imide (Ib): A stirred mixture of the hydrochloride salt of Ib (10 g.) in water (150 ml.) and ether (200 ml.) was neutralized by the addition of sodium carbonate. The aqueous layer was reextracted with ether (2× 200 ml.). The combined ethereal extracts were washed with water, followed by water saturated with sodium chloride (3×) and dried (sodium sulfate). Removal of the ether left colorless crystals of the racemic base Ib (9.3 g.), m.p. 106–107.5°.

B. (+)-10-Camphorsulfonic Acid Salt of (−)-5-*endo*-benzoyloxy - N - (3-dimethylaminopropyl)bicyclo[2.2.1]-heptane-2,3-di-*endo*-carboxylic Acid Imide: A hot solution of (+)-10-camphorsulfonic acid (276.5 g., 1.19 mole) in ethanol (1.1 l.) was added to a hot solution of the racemic base Ib (441.1 g., 1.19 mole) in ethanol (3.5 l.) containing water (175 ml.). The solution was heated to near boiling and then rapidly cooled to 20°. The colorless crystaline material which formed during 3 hours standing at 20° was collected and washed with cold ethanol (600 ml.) to give 325.3 g. of the title product, m.p. 221–226°. The salt was recrystallized from acetonitrile to give colorless needles (282.6 g.), m.p. 230–233°. The ethanolic mother liquor was retained for isolation of the (+)-isomer.

C. (−)-5-*endo*-Benzoyloxy - N - (3-dimethylaminopropyl))bicyclo[2.2.1]heptane-2,3 - di-*endo*-carboxylic Acid Imide: The camphorsulfonic acid salt from step B (282.6 g.) was partitioned between a stirred mixture of ethyl acetate (3.5 l.) and water (3 l.) containing sodium carbonate (150 g.). The aqueous layer was re-extracted with ethyl acetate (600 ml.). The combined ethyl acetate extracts were washed with water saturated with sodium chloride (3×), and dried (sodium sulfate). Removal of the ethyl acetate left the title product as colorles crystals (173.3 g.): m.p. 131.5–132.5°; $[\alpha]_D^{25}$ −78.53° (c. 4.26, ethanol).

D. (−)-5-*endo*-Benzoyloxy - N - (3-dimethylaminopropyl)bicyclo[2.2.1]heptane-2,3-di-*endo*-carboxylic Acid Imide Hydrochloride (V): To a near boiling solution of the (−)-isomer (173.3 g., 0.468 mole) from step C in 95% ethanol (3.5 l.) was added 475 ml. of 95% ethanol, 0.988 molar in hydrogen chloride (0.468 mole of HCl). The solution was cooled in ice. The colorless crystals were collected, washed with cold 95% ethanol (600 ml.) and dried to give the title product (182.6 g.): m.p. 207–209°; $[\alpha]_D^{25}$ −85.56° (c. 1.5, water). The m.p. and rotation were not significantly changed upon further recrystallization from 95% ethanol.

II. Preparation of the (+)-enantiomer

A. (−)-Tartaric Acid Salt of (+)-5-*endo*-benzoyloxy-N - (3 - dimethylaminopropyl)bicyclo[2.2.1]heptane-2,3- di-*endo*-carboxylic Acid Imide: The ethanolic mother liquor from step IB above was stored at 0° for 90 hours to give additional crystalline material (237.2 g.), m.p. 183–186°. The filtrate was concentrated to give another crop of colorless crystals (119.9 g.), m.p. 168–177°. Both crops were combined and partitioned between ethyl acetate and aqueous sodium carbonate as described in IC. above to give a mixture of (+)- and (−)-isomers (221.4 g.), m.p. 125–129°, greatly enriched in the (+)-enantiomer.

(−)-Tartaric acid (89.6 g., 0.596 mole) was added to a hot stirred solution of the (+)-enriched mixture (221.4 g., 0.596 mole) in ethanol (3.6 l.) containing water (40 ml.). The stirred mixture was heated to near boiling and then cooled to 25° during 4 hours. The colorless crystalline material was collected, washed with cold 95% ethanol (500 ml.) and dried to give the tartrate salt of the (+)-enantiomer (291.6 g.), m.p. 157–161° (dec.). Recrystallization from acetonitrile gave 247.2 g. of the purified tartrate salt, m.p. 162–164° (dec.).

B. (+)-5-*endo*-Benzoyloxy - N - (3-dimethylaminopropyl)bicyclo[2.2.1]heptane - 2,3-di-*endo*-carboxylic Acid Imide: The tartrate salt from step A (247.2 g.) was decomposed with aqueous sodium carbonate and the liberated (+)-enantiomer extracted into ethyl acetate as described in I.C. Removal of the ethyl acetate left the (+)-isomer (171.6 g.), as colorless crystals: m.p. 131–133.5°; $[\alpha]_D^{25}$ +77.74° (c. 1.89, ethanol).

C. (+)-5-*endo*-Benzoyloxy - N - (3-dimethylaminopropyl)bicyclo[2.2.1]heptane - 2,3 - di-*endo*-carboxylic Acid Imide Hydrochloride (VI): The (+)-enantiomer (171.6 g.) from step B was treated with an equivalent of ethanolic hydrogen chloride as described for the (−)-enantiomer in ID. to give colorless crystals of the (+)-enantiomer HCl, (188.2 g.): m.p. 207–209°; $[\alpha]_D^{25}$ +85.88° (c. 1.36, water).

EXAMPLE 21

Preparation of 5-*endo*-Benzoyloxy-N-(2-dimethylaminoethyl)bicyclo[2.2.1]heptane - 2,3 - di - *endo*-carboxylic Acid Imide (Ij)

Substitution in the procedure of example 3 for the "appropriate" benzoyl halide used therein of an equimolar quantity of benzoyl chloride and for the dicarboxylic acid imide an equimolar quantity of IIIb obtained in Example 13, produces the title compound.

EXAMPLE 22

Preparation of 5-*endo* - 4 - Nitrobenzoyloxy-N-(3-piperidinopropyl)bicyclo[2.2.1]heptane - 2,3 - di-*endo*-carboxylic Acid Imide (Ik)

Substitution in the procedure of example 3 for the "appropriate" benzoyl halide used therein of an equimolar quantity of 4-nitrobenzoyl chloride and for the dicarboxylic acid imide III used therein of IIIe produced the title compound.

EXAMPLE 23

Preparation of 5-*endo*-Benzoyloxy-N-(2-dimethylaminoethyl)bicyclo[2.2.1]heptane - 2,3 - di - *endo*-carboxylic Acid Imide Substitution in the procedure of example 3 for the "approprate" benzoyl halide used therein of an equimolar amount of benzoyl chloride and for the dicarboxylic acid amide III used therein an equimolar quantity of IIIb produces the title compound.

EXAMPLE 24

Preparation of 5-*endo*-3,4,5-Trimethoxybenzoyl-N-(2-dimethylaminoethyl)bicyclo[2.2.1]heptane - 2,3-di-*endo*-carboxylic Acid Imide (Im)

Substitution in the procedure of example 3 for the "appropriate" benzoyl halide used therein of an equimolar quantity of 3,4,5-trimethoxybenzoyl chloride and for the dicarboxylic acid imide III used therein an equimolar quantity of IIIb produced the title compound.

*Anal.*—Calc'd. for $C_{23}H_{30}O_7N_2 \cdot HCl \cdot 1/3\ H_2O$: C, 56.44; H, 6.54; N, 5.71. Found: C, 56.63; H, 7.08; N, 5.91.

EXAMPLE 25

Preparation of 5 - *endo*-Benzoyloxy-N-(3 - methylaminopropyl)bicyclo[2.2.1]heptane-2,3-di-*endo* - carboxylic Acid Imide Hydrochloride (Ij).

A. 5-*endo*-Benzoyloxy-N-[3 - (2,2,2 - trichloroethoxycarbonyl) - 3 - methylaminopropyl]bicyclo[2.2.1]heptane-2,3-di-*endo*-carboxylic Acid Imide: Under anhydrous conditions there was added 4.66 g. (22 mmoles) of trichloroethyl chloroformate to a mixture of 3.7 g. (10 mmoles) of compound Ib and 2.0 g. (14.5 mmoles) potassium carbonate in 50 ml. benzene. The reaction mixture was refluxed for 18 hours. After cooling, ethyl acetate was added and the solution was filtered from the insolubles. The filtrate was washed with water, 5% $K_2CO_3$, water, 5% HCl, water and brine. After drying ($Na_2SO_4$) and filtration the solvents were evaporated. In this manner there was obtained a crude product which when recrystallized from ethyl acetate-skelly B (essentially n-hexane) afforded 3.5 g. (65.7%) of pure title product; m.p. 104–107° C.

*Anal.*—Calc'd. for $C_{23}H_{24}Cl_3N_2O_6$: C, 51.94%; H, 4.74%; N, 5.27%. Found: C, 51.75%; H, 4.76%; N, 5.08%.

B. 5-*endo*-Benzoyloxy - N - (3-methylaminopropyl)bicyclo[2.2.1]heptane-2,3 - di-*endo*-carboxylic Acid Imide Hydrochloride: Zinc dust (11.0 grams) was added to a solution of 5.56 g. (10.5 mmoles) of the compound prepared in A above in 120 ml. of 90% acetic acid. The resulting reaction mixture was stirred at room temperature for four hours. The mixture was filtered and the filtrate evaporated to dryness. The residue was made basic by the addition of sodium bicarbonate and again was evaporated to dryness. Benzene (500 ml.) and $Na_2SO_4$ was added to the residue. The mixture was filtered; the filtrate was evaporated and the residue was dissolved in methanol. Some ether was added, and the hydrochloride salt was prepared with anhydrous hydrogen chloride gas. The precipitated salt was collected and after several recrystallizations from methanol-ether, there was obtained a 72% yield of title compound (Ij), m.p. 196–199° C.

*Anal.*—Calc'd. for $C_{20}H_{24}N_2O_4 \cdot HCl \cdot 0.2\ H_2O$: C, 60.45%; H, 6.40%; N, 7.05%; KF, 1.13%. Found: C, 60.62%; H, 6.44%; N, 7.04%; KF, 1.83%.

EXAMPLE 26

Preparation of 5-*endo*-Benzoyloxy-N-(3-aminopropyl)bicyclo[2.2.1]heptane-2,3 - di - *endo* - carboxylic Acid Imide (Ik)

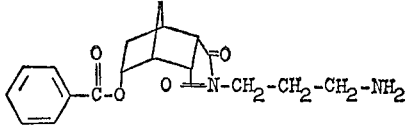

A. 5-*endo*-Hydroxy-N-(3 - cyanoethyl)bicyclo[2.2.1]-heptane-2,3-di-*endo*-carboxylic Acid Imide (XI): Substitution in the procedure of examples 2 or 4 for the appropriate amine used therein of an equimolar quantity of 2-cyanoethylamine produces the title compound.

B. 5-*endo*-Benzoyloxy-N-(3-cyanoethyl)bicyclo[2.2.1]-heptane-2,3-di-*endo*-carboxylic Acid Imide (XI): Substitution in the procedure of example 3 for the appropriate benzoyl halide used therein of an equimolar quantity of benzoyl chloride produces the title compound X.

C. 5-*endo*-Benzoyloxy - N - (3 - aminopropyl)bicyclo[2.2.1]-heptane - 2,3-di-*endo*-carboxylic Acid Imide (IIIk): One-tenth mole of compound XI prepared in B above is dissolved in 200 ml. of ethanol and hydrogenated at 60 p.s.i. using Pd/C and hydrogen till two-tenths mole of hydrogen is absorbed to produce compound Ik.

I claim:
1. A compound having the formula

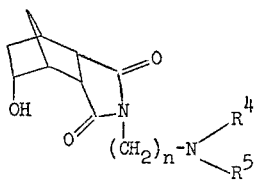

in which $n$ is an integer of 2 to 4 inclusive and each of $R^4$ and $R^5$ are H or (lower)alkyl or when taken together with the nitrogen a radical of the formula

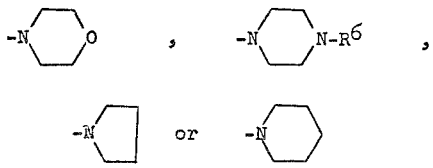

in which $R^6$ is (lower)alkyl; or an acid addition salt thereof.

2. A compound of claim 1 wherein each of $R^4$ and $R^5$ are H or (lower)alkyl or when taken together with the nitrogen a radical of the formula

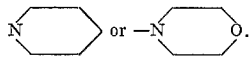

3. A compound of claim 1 wherein each of $R^4$ and $R^5$ are (lower)alkyl or when taken together with the nitrogen a radical of the formula

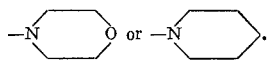

4. The compound of claim 1 wherein $n$ is an integer of 3 and $R^4$ and $R^5$ are methyl; or the hydrochloride salt thereof.

5. The compound of claim 1 wherein $n$ is an integer of 2 and $R^4$ and $R^5$ are methyl; or the hydrochloride salt thereof.

6. The compound of claim 1 wherein $n$ is an integer of 3, and $R^4$ and $R^5$ taken together with the nitrogen is a radical of the formula

or the hydrochloride salt thereof.

7. The compound of claim 1 wherein $n$ is an integer of 3 and $R^4$ and $R^5$ taken together with the nitrogen is a radical of the formula

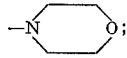

or the hydrochloride salt thereof.

8. The compound of claim 1 wherein $n$ is an integer of 3 and $R^4$ and $R^5$ are each (lower)alkyl; or the hydrochloride salt thereof.

9. A compound of claim 1 wherein $n$ is an integer of 2 to 4 inclusive and $R^4$ is H, $R^5$ is H or (lower)alkyl; or an acid addition salt thereof.

10. A compound of claim 9 whereni $R^5$ is H, methyl, ethyl or propyl.

11. The compound of claim 9 wherein $R^5$ is methyl.

12. The compound of claim 9 wherein $R^5$ is H.

References Cited
UNITED STATES PATENTS
3,084,167   4/1963   Rice _____ 260—319
FOREIGN PATENTS
1,570,452   6/1969   France _____ 260—247.2
OTHER REFERENCES
Hulsgen, R et al.: Angew. Chem. Int. Ed Gngl., 1969, 8(8), 604.

LORRAINE A. WEINBERGER, Primary Examiner
P. J. KILLOS, Assistant Examiner

U.S. Cl. X.R.
260—268 TR, 293.61, 326 C, 343.3; 424—248, 267, 274